United States Patent

Snitzer

[15] 3,646,462
[45] Feb. 29, 1972

[54] FIBER FOR DISTORTION-FREE PROPAGATION

[72] Inventor: Elias Snitzer, Wellesley, Mass.
[73] Assignee: American Optical Corporation, Southbridge, Mass.
[22] Filed: Nov. 14, 1969
[21] Appl. No.: 876,838

[52] U.S. Cl. .......................................... 330/4.3, 350/96
[51] Int. Cl. .......................................... H01s 3/02, H01s 3/08
[58] Field of Search ............... 331/94.5; 330/4.3; 350/96

[56] References Cited

UNITED STATES PATENTS

| 3,109,065 | 10/1963 | McNaney | 350/96 |
| 3,308,394 | 3/1967 | Snitzer et al. | 330/4.3 |
| 3,508,165 | 4/1970 | Nicolai | 350/96 |

OTHER PUBLICATIONS

C. G. Young, Gliss Lasers, 7/69, pg. 1267–1289.
Uchida, IEEE, 7.7, A Light Focusing Fiber Guide, May 26, '69.
G.C. Holst, High Coherence High Power Laser System at 1.0621u, IEEE10.5;
IEEE 2.2, Holst, Detection With a Fiber Laser Preamplifier at 1.06u, May 26, 69.

*Primary Examiner*—Rodney D. Bennett, Jr.
*Assistant Examiner*—N. Moskowitz
*Attorney*—William C. Nealon, Noble S. Williams, Robert J. Bird and Bernard L. Sweeney

[57] ABSTRACT

A fiber for use in the propagation of light pulses with the attendant elimination of distortion. The fiber is useful as a delay line storage device for computer information with an extremely high-packing density capability for the bits of information. Another application is in a broadband communication system as a transmission line and in any application the fiber may be "active" as either a laser amplifier or oscillator. Basically, the invention involves the choice of fiber core and cladding size and other parameters to counteract, with the anomalous dispersion associated with the waveguide transmission, the normal dispersion of the bulk glass from which the fiber is made. The pulses of light are thereby propagated undistorted since the various frequency components within the light pulse are propagated with an effective velocity which is independent of wavelength in the spectral interval of the pulse.

10 Claims, 4 Drawing Figures

INVENTOR
ELIAS SNITZER
BY Amster & Rothstein
ATTORNEYS $$u = \frac{2\pi a}{\lambda}(n_1^2 - n_2^2)^{\frac{1}{2}}$$

FIBER FOR DISTORTION-FREE PROPAGATION

This invention relates primarily to fiber optic devices and more particularly to the construction of such devices for use as a propagation medium for a high density of information with substantially distortion-free output.

With the advent of mode-locked pulses whose duration is of the order of $10^{-12}$ seconds, a number of devices can be considered to utilize such pulses. For instance, a delay line storage device for computer information can advantageously use a high-density storage medium to propagate light pulses generated by one or more mode-locked oscillators and associated circuitry. The light from the pulse generator is modulated in one of a number of ways, such as allowing or not allowing the given pulse to pass, or some other scheme for indicating two or more states for the information contained in a single pulse or a group of pulses. The pulses of light may then be focused by a lens into a long fiber (of the order of several inches and even meters in length). The output of the fiber can then be received by a detector whose output is used both to control the modulator for recirculation of the light pulses through the fiber and also as the input for other circuitry. By way of preliminary explanation, it should be understood that the phrase "mode-locked pulses" refers to pulses wherein the phase relationship between various frequencies is such that there is coherent reinforcement at one time and one position in the propagation and destruction at other positions at the same time in that medium.

In these and other schemes, it may be seen that very short pulses are desired for high storage density capability. It is now possible to produce very short pulses in the picosecond domain. As an example, a pulse of $10^{-12}$ seconds has a spatial extent in glass of approximately two-tenths of a millimeter. A 2-meter-long fiber could then in principle store $10^4$ bits of information. If the fibers are packed with a density of 10 microns center-to-center spacing, a 1-centimeter squared cross section would contain $10^6$ fibers. Such a propagation medium would then provide an information density capability of $10^{10}$ bits with an access time determined by the propagation time for light in the 2-meter-long fiber, which would be $10^{-8}$ seconds.

In order to utilize the inherent high density of storage provided by picosecond pulses, it is necessary that the pulses not experience a distortion in their shape, and, in particular, the distortion should not be of the type that would elongate the pulse. As the pulses get shorter, the special content of the pulses gets larger according to the following relationship:

$$\tau \quad (1/\Delta \nu)$$

where $\tau$ is the pulse duration and $\Delta \nu$ is the bandwidth of the pulse.

Therefore, a pulse duration of $10^{-12}$ seconds produces approximately a 30-Angstrom bandwidth. According to normal dispersion, the higher frequencies in the bandwidth created propagate at slower velocities, this normal dispersion being due to the glass material chosen for the core and cladding of the fiber.

Accordingly, a primary object of the present invention is to provide a fiber optics construction to obtain essentially single-mode transmission of a pulse of light having a band of frequency components. The fiber device has the property that the waveguide mode characteristics of the fiber produce effective "anomalous" dispersion which cancels the normal dispersion of the bulk glass of which the fiber is made to avoid propagation distortion. A more particular object is to provide a group velocity for propagation of the mode which has a negative dispersive value, that is, the group velocity has a higher value at higher frequencies than the group velocity at lower frequencies in the pulse.

Another application for propagation of light in fibers without dispersive distortion is as a transmission line in a broadband communications system; here the information would be an amplitude or frequency modulated carrier frequency or could be in the form of pulse code modulation.

These and other objects are accomplished in one illustrative embodiment of the present invention wherein fiber size and other parameters thereof are chosen to allow substantially single-mode propagation. By chosing a small enough fiber core or a low enough frequency of propagation, single-mode propagation can be obtained. However, because of the relationship between frequency and the propagation constant for low frequencies in particular, it may be shown that the group velocity of mode propagation decreases with higher frequencies below the cutoff point for certain higher order modes. It is therefore desirable to operate above the cutoff point in the relationship between frequency and the propagation constant. It is known that higher order modes are potential sources of additional pulse distortion by crosstalk of information between propagating modes. It is, therefore, necessary to not only obtain a high enough change in group velocity of mode propagation per change in frequency to be above some higher order mode cutoff point, but also to provide an absorbing cladding to eliminate the more off-axis higher order modes.

The above brief description, as well as further objects, features and advantages of the present invention will be more fully appreciated by reference to the following detailed description of a presently preferred, but nonetheless illustrative embodiment in accordance with the present invention, when taken in conjunction with the accompanying drawing, wherein.

Figure 1:
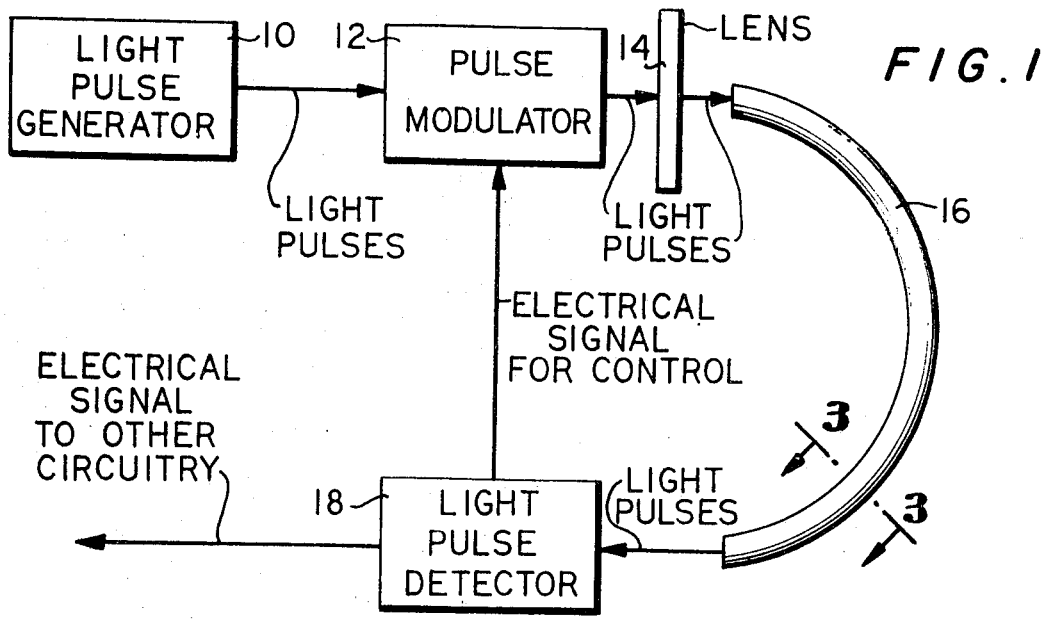
FIG. 1 is a schematic block diagram of a system in which the present invention is useful.
Figure 3:
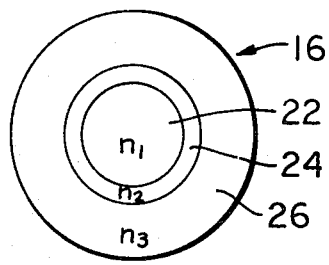
Figure 4:
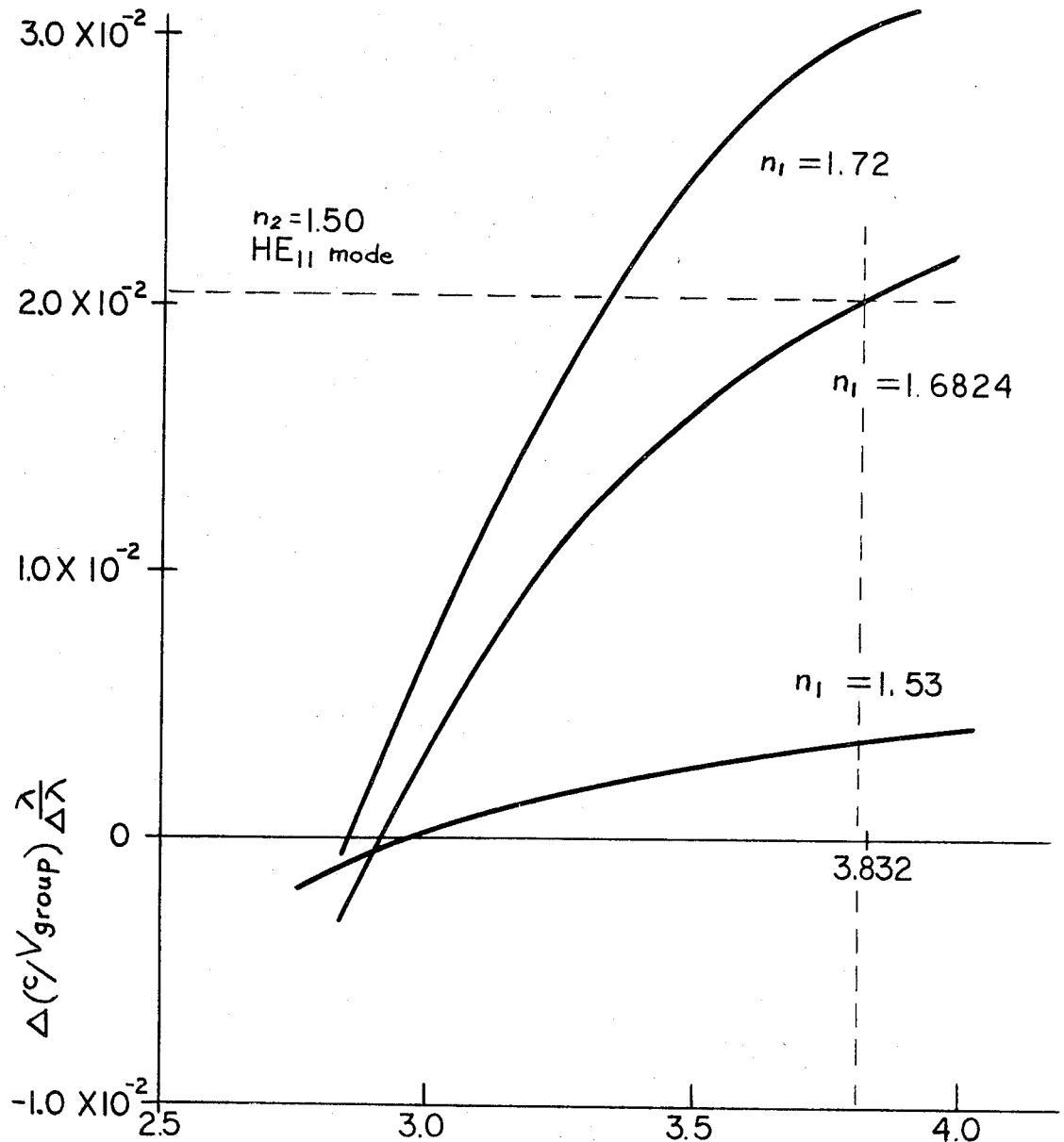

FIG. 3 is a sectional representation along the line 3—3 of FIG. 1 of a fiber constructed according to the present invention; and FIG. 4 is a graphical representation of the relationship between the fiber characteristic of fractional change in group index of refraction per fractional change in the waveguide of propagation versus the waveguide mode parameter for various indices of refraction of the core material.

Referring particularly to the drawings, FIG. 1 represents a system using a fiber constructed according to the present invention as a delay line storage device for computer information. A string of pulses is generated by light pulse generator 10, which is made up of one or more mode-locked oscillators together with associated circuitry (not shown). With very short pulses in the picosecond domain being produced, a pulse of $10^{-12}$ seconds has a spatial extent in the 2-meter fiber bundle 16 of two-tenths of a millimeter. The fiber 16 stores, therefore, $10^4$ bits of information. If the fiber bundle 16 is constructed from a number of fiber optic devices whose center-to-center packing density is 10 microns, a 1-centimeter squared cross section of the fiber bundle 16 contains $10^6$ fibers. An information density capability of $10^{10}$ bits is then attained with an access timed determined by the propagation time for light in the 2-meter-long fiber which would be $10^{-8}$ second. Each fiber in the bundle would have its own pulse modulator and pulse detector.

Of course, other applications are possible for utilization of the short duration pulses. An example is a pulsed-code-modulation communication system. Here, single-mode fibers would be used as the transmission line for sending information between transmitter and receiver. Just as in the delay line storage shown in FIG. 1, it is necessary for maximum utilization of the system (maximum data rate for the communication system as well as maximum storage per unit length of delay line storage element) that the pulses of light which represent the information be as short as possible and that no distortion, and, in particular, elongation of the pulses take place.

Figure 2:
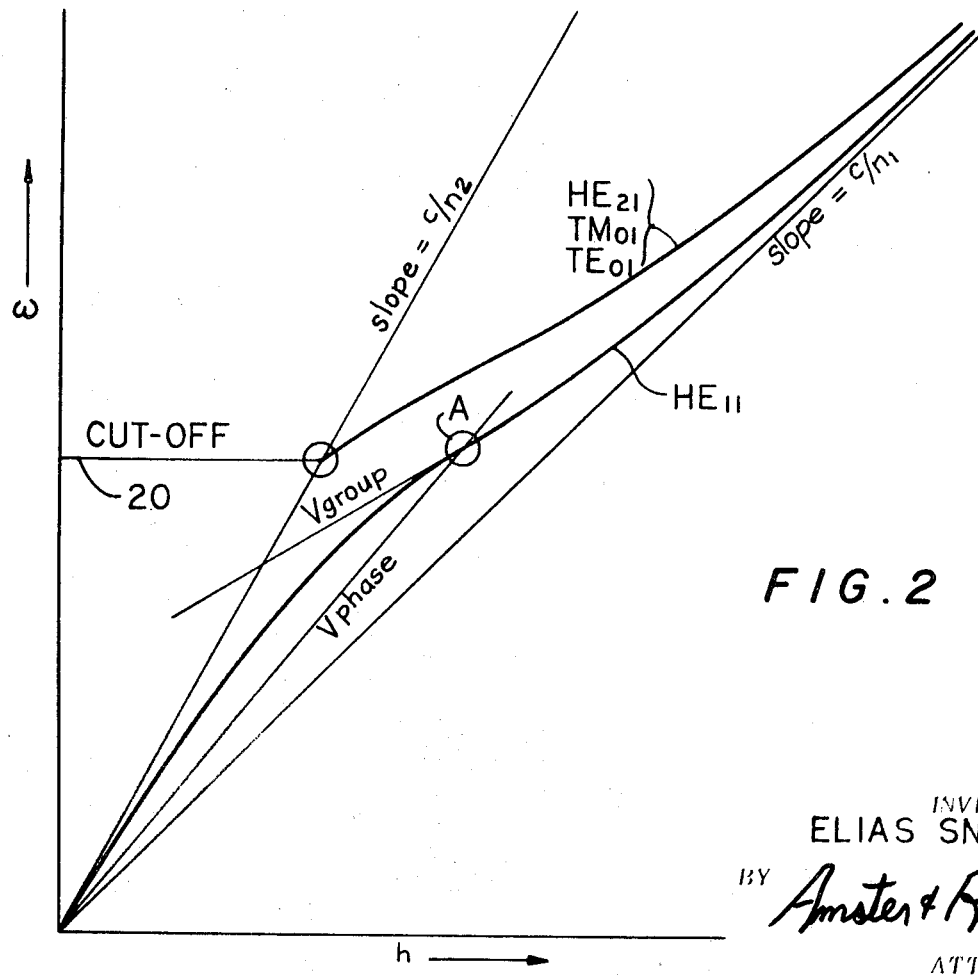
FIG. 2 is a graphical representation of the relationship between frequency and the propagation constant for group and phase velocity in certain of the lower order modes.

Referring specifically to FIG. 2, mode lines are shown as curves for providing the relationship between the propagation constant $h$ for the given waveguide mode and the circular frequency $\omega$. It is customary to draw the mode line with the vertical coordinate $\omega$ and the horizontal coordinate $h$. It should be understood that a waveguide mode is characterized by a dependence on time $t$ and $z$, a direction parallel to the waveguide axis such that the various electric and magnetic field components all have $z$ and $t$ dependencies given by the following trigonometric equation:

$$\exp[i(hz-\omega t)]$$

where $\omega=2\pi c/\lambda$, the frequency of the light transmitted. Also, the propagation constant $h$ is a function of the frequency $\omega$, the radius $a$ of the core of the fiber, the indices of refraction $n_1$ and $n_2$, of the core and cladding, respectively, and the particular mode which is being considered. The various mode lines of FIG. 2 are represented by curves which are confined to the region, as shown in FIG. 2, bounded by the two straight lines through the origin whose slopes are $c/n_1$ and $c/n_2$. The lowest order $HE_{11}$ mode propagates at all frequencies, but all other modes have cutoffs, that is, for a given mode, propagation is not possible at frequencies below the cutoff frequency. The cutoff frequency for the nearly degenerate group of modes that are able to propagate beyond the $HE_{11}$ mode is at a frequency $\omega$ represented by line 20, which is the lowest frequency at which that group of modes can propagate in the fiber. The nearly degenerate set of three modes, $HE_{21}$, $TM_{01}$, and $TE_{01}$, is shown with only one mode line to describe them. From the mode line, the group velocity and the phase velocity are graphically described in FIG. 2. In a case where the frequency of propagation is such that the propagation occurs in the $HE_{11}$ mode at any point on the graph of FIG. 2, the slope of the line connecting that point to the origin of the graph is the phase velocity $V_{phase}$ and the slope of the tangent to the mode line at this point is the group velocity $V_{group}$.

Assuming $n_2$ is the index of refraction of the fiber cladding and $n_1$ is the index of refraction of the core, the $HE_{11}$ mode is characterized by the fact that it asymptomically approaches the line with slope $c/n_2$ as the frequency reduces to zero. It asymptomatically approaches the line with slope $c/n_1$ as the frequency is allowed to increase to very larger values. This produces a curve whose slope as a function of frequency first decreases as the frequency is increased from zero, passes through an inflection point at which $(dV_{group}/d\omega)$ is zero, and then the slope as a function of frequency increases to the final value $c/n_1$ for very high frequencies. For clarity in this discussion, the inflection point hereafter will be referred to as point A in FIG. 2. Since we want higher frequencies to have greater group velocities, and below point A the group velocity decreases with higher frequency, whereas above point A the group velocity increases with higher frequencies, the desired range of the curve is above the point A.

As stated previously, however, operation above point A is also above the cutoff frequency for the next higher order modes, so that propagation of the higher order modes $TE_{01}$, $TM_{01}$, and $HE_{21}$, is also enabled. In order to deter the effect of these higher order modes and still operate above point A, other means are available such as the use of an absorbing cladding. Operation of a clad fiber at frequencies above the inflection point for $V_{group}$ as a function of frequency is a necessary condition for the fiber to give an anomalous dispersion that cancels the normal dispersion of the glass, but is not a sufficient condition for this desired result. In addition, the difference in indices of refraction between core and cladding must be sufficiently great to give a large enough anomalous dispersion to cancel the glass dispersion, since for larger index differences the rate of change of $V_{group}$ with $\omega$ is greater than for small index differences. For example, for a cladding glass of $n_2=1.8$, $n_1-n_2$ should be 0.1 or greater.

A convenient description of the propagating modes in a circular fiber can be expressed in terms of a parameter $u$ which is defined by the following equation:

$$u = \frac{2\pi a}{\lambda}\sqrt{n_1^2 - n_2^2}$$

For $u$ less than 2.405, only the $HE_{11}$ mode propagates. For a value of $u$ between 2.405 and 3.832, the higher order modes $TE_{01}$, $TM_{01}$, and $HE_{21}$ can also propagate, and the still higher order modes are cut off. This range, therefore, is the desired operating range for the parameter $u$ in the graph of FIG. 4.

In order to determine the required radius for the core of the clad fiber it is necessary to calculate the values of the propagation constant $h$ as a function of the frequency $\omega$. This calculation requires the solution of a transcendental equation which depends on Bessel and Hankel functions. The equation to be solved is given in the published article entitled "Cylindrical Dielectric Waveguide Modes" by E. Snitzer, Journal of the Optical Society of America Vol. 51, No. 5, pp. 491-498 (May 1961). The required equation for solution is eq. 20 of the above article. The solution provides the mode line as shown in FIG. 2. After obtaining the data for the mode line, the slope of the mode line can be calculated as a function of frequency or of the core radius. This latter calculation has been carried out and is given in FIG. 4. For convenience, the data is presented for $[\Delta(c/V_{group})(\lambda/\Delta\lambda)]$ as a function of the parameter $u$ which was previously defined. The data in FIG. 4 is presented on the assumption that the cladding has an index of refraction $n_2=1.50$, but with three different curves for values of the core index equal to 1.53, 1.6824, and 1.72.

Summarizing briefly, in order to obtain substantially single-mode propagation without pulse distortion, the fiber core 22 (FIG. 3) must be of a size to support not only the lowest order $HE_{11}$ mode, but also the next higher order group of modes. In order to both satisfy the requirement of no pulse distortion by effective zero net dispersion and avoidance of the complexities of multimode propagation, absorption in the cladding can be utilized to selectively attenuate the higher order modes. Therefore, fibers should be used which satisfy the zero dispersion requirement (operation above point A on FIG. 2) but in which there is added to the cladding 24 constituents absorbing to the light propagated in the core 22. Since the higher order modes are more off-axis and propagate with greater light intensity in the cladding 24 than the lowest order mode, the absorbing constituent in the cladding attenuates the higher order modes more severely. If laser light is propagated in the core 22 at $1.06 <$ microns, a cladding glass which comprises suitable concentrations of $Sm^{3+}$ can be used. At 1.06 microns other ions which are suitable for absorbing capability in the cladding are $Dy^{3+}$, $Fe^{2+}$ and $Cu^{2+}$. The samarium is preferable for use with neodymium glass fiber lasers.

Rather than uniformly dispersing the samarium through the cladding, it is also possible, as shown in FIG. 3, to clad the core 22 with a thin clear glass cladding 24 and then to utilize a second glass cladding 26, having an index of refraction $n_3$, which includes the samarium. For appropriately thin first claddings 24 (approximately one-tenth to one-fourth the value of $\lambda$), there is enough penetration to attenuate the higher order modes, but at the same time provide much less attenuation to the $HE_{11}$ mode. The following table represents some of the actual fiber constructions which were operated as lasers according to the present invention without distortion:

| $\lambda$ | $n_1$ | $n_2$ | $n_3$ |
|---|---|---|---|
| 1.014 | 1.6833 | 1.4992 | 1.5065 |
| 1.060 | 1.6824 | 1.4986 | 1.5060 |

By use of the glasses of FIGS. 2 and 4 and in accordance with the above description, the following example is presented for the design of a fiber device in order to provide a more complete understanding of the present invention:

Assume that the core glass for the fiber device is a neodymium doped lead flint silicate glass having an index of refraction of 1.6824 at 1.060 microns wavelength and an index of refraction of 1.6833 at 1.014 microns wavelength, and the cladding glass is a samarium-doped alkali, alkaline earth silicate glass having an index of refraction of 1.4986 at 1.060 microns wavelength and an index of refraction of 1.4992 at 1.014 microns wavelength. The measured normal dispersion would be approximately $-2.03\times10^{-2}$ and the anomalous dispersion $\Delta(c/V_{group})(\lambda/\Delta\lambda)$ to counteract the normal glass dispersion would be $+2.03\times10^{-2}$.

Using the graph of FIG. 4 (the broken lines on that graph) a parameter $u$ of 3.8 (which is within the 2.405–3.832 range for operation above the inflection point discussed above) would result. Calculating $a$ for $V=3.8$:

$$a = \frac{u\lambda}{2\pi(n_1^2 - n_2^2)^{1/2}}$$

$$a = \frac{1.060 \times 3.8}{2\pi(1.6824^2 - 1.4986^2)^{1/2}}$$

$$a = .85 \text{ microns} = \text{radius of core}$$

The cladding $n_2$, if a double-clad fiber shown in FIG. 3 were used with cladding $n_2$ clear and cladding $n_3$ samarium doped, would be chosen to be approximately 1/10–1/4 of the wavelength (1.060 microns) in thickness.

While mode-locked pulses can be obtained in laser oscillators in which a saturable dye is included to give mode-locked, Q-switched output, it is well known that the pulses so generated at the present time are erratic in shape. A further use of the present invention is to use an active fiber, constructed as described herein, as an amplifier for shaping an erratically generated mode-locked, Q-switched pulse from an appropriate oscillator into a well-shaped pulse whose half-intensity is $10^{-12}$ seconds or less by producing a saturated steady-state pulse in the amplifier.

I claim:

1. A fiber optic device for use as a light transmission line including a core and cladding, said core having an index of refraction, $n_1$, in relation to the index of refraction, $n_2$, of the cladding at the wavelength of transmission, $\lambda$, and a radius, $a$, which provides a dispersion in the group velocity for propagation in a given dielectric waveguide mode which is equal in magnitude and opposite in sign to the normal dispersion of the material of which said core is made, said indices of refraction, said radius and said wavelength of transmission being related by the following expression $$u = \frac{2\pi a}{\lambda}\sqrt{n_1^2 - n_2^2}$$

where $u$ is greater than approximately 2.6.

2. The invention according to claim 1 wherein said given mode is the lowest order $HE_{11}$ mode.

3. The invention according to claim 2 wherein said cladding includes a constituent absorbing to the light of the transmitted wavelength so that the higher order modes are absorbed more than said $HE_{11}$ mode.

4. The invention according to claim 3 wherein said core includes a laserable material.

5. The invention according to claim 3 wherein said wavelength of transmission is 1.06 microns and said cladding is a samarium-doped glass.

6. The invention according to claim 5 wherein said core includes a neodyminum-doped glass.

7. The invention according to claim 3 wherein said wavelength of transmission is 1.06 microns and said cladding is a glass doped with an element chosen from a group consisting of $Sm^{3+}$, $Dy^{3+}$, $Fe^{2+}$ $Cu^{2+}$.

8. The invention according to claim 1 wherein said core includes a laserable material and said fiber optic device is used as a travelling-wave amplifier for shaping a generated light pulse incident to said device.

9. The invention according to claim 1 wherein said transmission line is a delay line storage device for a computer.

10. The invention according to claim 1 wherein said transmission line is for use in a broadband communication system.

* * * * *